(12) United States Patent
Schlachter et al.

(10) Patent No.: US 8,499,640 B2
(45) Date of Patent: Aug. 6, 2013

(54) MEASURING APPARATUS FOR DETERMINING A PRESSURE DIFFERENCE

(75) Inventors: Marc Schlachter, Wehr (DE); Andreas Spitz, Schopfheim (DE); Roland Dieterle, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 232 days.

(21) Appl. No.: 13/139,767

(22) PCT Filed: Nov. 20, 2009

(86) PCT No.: PCT/EP2009/065530
§ 371 (c)(1), (2), (4) Date: Jun. 15, 2011

(87) PCT Pub. No.: WO2010/078993
PCT Pub. Date: Jul. 15, 2010

(65) Prior Publication Data
US 2011/0247423 A1 Oct. 13, 2011

(30) Foreign Application Priority Data

Dec. 18, 2008 (DE) .......................... 10 2008 054 913

(51) Int. Cl.
*G01L 13/02* (2006.01)
*G01L 15/00* (2006.01)

(52) U.S. Cl.
USPC .................................. 73/716; 73/700; 73/753

(58) Field of Classification Search
None
See application file for complete search history.

(56) References Cited

U.S. PATENT DOCUMENTS 4,244,226 A * 1/1981 Green et al. .................... 73/703
(Continued)

FOREIGN PATENT DOCUMENTS

| CN | 1131461 A | 9/1996 |
|---|---|---|
| CN | 2655213 Y | 11/2004 |

(Continued)

OTHER PUBLICATIONS

English Translation of IPR
(Continued)

*Primary Examiner* — Lisa Caputo
*Assistant Examiner* — Jermaine Jenkins
(74) *Attorney, Agent, or Firm* — Bacon & Thomas, PLLC

(57) ABSTRACT

A measuring apparatus for outputting a measurement signal representing the difference between a first pressure and a second pressure. The apparatus includes a first pressure measuring transducer module for outputting a sequence of first signals representing the first pressure; a second pressure measuring transducer module for producing a sequence of second signals representing the second pressure; an evaluation module for ascertaining a sequence of difference values between the two pressure values and for outputting a sequence of fourth signals, which, in each case, represent the pressure difference; a first cable connection between the first and second pressure measuring transducer module; and a second cable connection between the second pressure measuring transducer module and the evaluation module. The modules are separated spatially from one another. The second pressure measuring transducer module has a mapping unit, which is provided for receiving the sequences of first and second signals, and for outputting to the evaluation module via the second cable connection a sequence of third signals, which, in each case, contain the pressure values.

8 Claims, 2 Drawing Sheets

U.S. PATENT DOCUMENTS

| | | | | |
|---|---|---|---|---|
| 4,244,229 A | * | 1/1981 | Pullen | 73/722 |
| 5,227,782 A | | 7/1993 | Nelson | |
| 5,329,818 A | * | 7/1994 | Frick et al. | 73/708 |
| 5,870,695 A | | 2/1999 | Brown | |
| 6,299,349 B1 | * | 10/2001 | Steinel et al. | 374/143 |
| 6,585,660 B2 | * | 7/2003 | Dorando et al. | 600/486 |
| 6,804,993 B2 | * | 10/2004 | Selli | 73/61.78 |
| 7,013,735 B2 | * | 3/2006 | Miyazawa | 73/717 |
| 7,685,880 B2 | * | 3/2010 | Landmann | 73/717 |
| 2007/0225934 A1 | | 9/2007 | Moriya | |

FOREIGN PATENT DOCUMENTS

| | | |
|---|---|---|
| DE | 100 54 745 A1 | 12/2001 |
| DE | 103 26 249 A1 | 2/2005 |
| DE | 10 2005 043 752 B3 | 5/2007 |

OTHER PUBLICATIONS

German Search Report, Nov. 20, 2009, Endress.
International Search Report.

* cited by examiner

MEASURING APPARATUS FOR DETERMINING A PRESSURE DIFFERENCE

TECHNICAL FIELD

The present invention relates to a measuring apparatus for outputting a measurement signal representing the difference between a first pressure of a medium at a first location and a second pressure of a medium at a second location.

BACKGROUND DISCUSSION

These measuring devices have, to the present point in time, most often been implemented in the form of pressure difference measurement transmitters, which comprise a pressure difference measuring transducer, which contains a pressure difference measuring membrane, which is contactable with a first pressure and a second pressure, wherein the first pressure counteracts the second pressure, so that the resulting deformation of the pressure difference measuring membrane is a function of the difference between the first pressure and the second pressure.

The conveying of the first pressure and of the second pressure from remote locations to the pressure difference measuring transducer usually occurs hydraulically, via oil-filled capillary lines. Due to the installation effort associated therewith, there have, for some time, been approaches to determine the pressure difference, wherein the first pressure and the second pressure are separately registered, the first pressure with a first pressure measuring transducer and the second pressure with a second pressure measuring transducer, and the pressure difference is determined based on the signals of the first and second transducers.

This principle is explained, for example, in "Hydrostatic Tank Gauging—technology whose time has come" (1990, ISA Services, Inc.).

For example, in 1992, Endress+Hauser offered and described a modular measuring apparatus for fill level measurement, "Liquid level transmitter Model DB40RL Sanitary Sensor deltapilot". Such apparatus includes two pressure measuring transducers, whose PFM signals are transmitted to an evaluation unit, wherein the evaluation unit digitizes the PFM signals and, based on the digitized PFM signals, calculates the pressure difference.

U.S. Pat. No. 5,227,782 discloses a so-called Hydraulic Interface Unit (HIU) for performing bidirectional, digital communication with a plurality of pressure measurement transmitters, wherein the communication signals are superimposed on the energy supply signal.

U.S. Pat. No. 5,870,695 discloses another pressure difference measuring arrangement with remote sensor units, whose signals are transmitted electrically.

On the one hand, a measuring arrangement with a remote evaluation module is present, which is connected with two pressure measuring transducer modules, in each case via a cable. This leads to a large cabling effort if the evaluation module is positioned a large distance from the pressure measuring transducer modules. Moreover, due to disturbance resistance, it can be required that the two interfaces of the evaluation module with to the pressure measuring transducer modules be equipped with disturbance removal measures, since, otherwise, especially in the case of hardwired disturbances, malfunctions can occur. A reason for this is, for example, that a typical 4 . . . 20 mA device possesses an electrical current control OP, which controls the electrical current through a shunt resistor. If the capacitance between the housing potential and circuit ground is too high, in the case of line-coupled disturbances, an error current flows through this shunt resistor. This, in turn, has the result that the electrical current control no longer functions faultlessly.

In other measuring arrangements, a so-called slave measurement transmitter is connected with a master measurement transmitter, wherein the slave transmitter provides to the master measurement transmitter a first pressure measurement value, and the master measurement transmitter itself ascertains a second pressure measurement value and contains an evaluation unit to calculate the pressure difference. This solution has the disadvantage that the master measurement transmitter, which usually contains servicing elements and connection clamps for a supply and data line from or to the control system, must be mounted on a process opening, for example, at the floor of a tank in the so-called sump area. This site can be difficult to access, for example. In the case of other measuring locations, unfavorable conditions for an operator or for a computer can reign there, be it extreme temperatures, media emissions, condensate, vibrations or noise. This solution is, consequently, not suitable for all measuring locations.

SUMMARY OF THE INVENTION

An object of the present invention is therefore to provide a measuring apparatus that overcomes the disadvantages of the state of the art.

The object is achieved according to the invention by the modular measuring apparatus for outputting a measurement signal representing the difference between a first pressure of a medium at a first location and the second pressure of a medium at a second location. The apparatus comprises: a first pressure measuring transducer module for registering the first pressure and for producing and outputting a sequence of first signals, which, in each case, represent a current value of the first pressure; a second pressure measuring transducer module for registering the second pressure and for producing a sequence of second signals, which, in each case, represent a current value of the second pressure; an evaluation module for ascertaining a sequence of difference values between the first pressure and the second pressure, and for outputting a sequence of fourth signals, which, in each case, represent a difference between the first pressure and the second pressure; a first cable connection between the first pressure measuring transducer module and the second pressure measuring transducer module; and a second cable connection between the second pressure measuring transducer module and the measurement transmitter, wherein the first pressure measuring transducer module is separated spatially from the second pressure measuring transducer module, and wherein the evaluation module is separated spatially from both pressure measuring transducer modules; and wherein the second pressure measuring transducer module has a mapping unit, which is provided for receiving the sequence of first signals and the sequence of second signals, and for producing a sequence of third signals, which, in each case, contain information concerning the first pressure and information concerning the second pressure based on at least one first signal and at least one second signal, and for outputting the sequence of third signals to the evaluation module via the second cable connection.

In a further development of the invention, the first signals can be digital signals, and/or the second signals can be digital signals.

In a further development of the invention, the evaluation module is connectable to a control system via a third cable connection, especially a two-wire line, wherein the measurement signal is to be output via the third cable connection, wherein the measuring apparatus is to be supplied with energy via the third cable connection, wherein the second pressure measuring transducer apparatus is to be supplied with energy via the second cable connection, and wherein the first pressure measuring transducer module is to be supplied with energy via the first cable connection.

The third cable connection can comprise especially a 4 to 20 mA current loop.

In a further development, the first signals are transmitted with a first transmission rate, the second signals with a second transmission rate and the third signals with a third transmission rate, wherein the first and/or the second transmission rate can differ from the third transmission rate The first transmission rate can especially be greater than the third transmission rate.

In a further development of the invention, the third signal can contain information concerning the first pressure as an average value of two or more first signals.

In a further development of the invention, the third signal can contain information concerning the second pressure as an average value of two or more second signals.

The evaluation module and/or the second pressure measuring transducer module can, according to an embodiment of the invention, in each case have a galvanically isolating interface.

The galvanically isolating interfaces can especially be inductively coupling interfaces.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
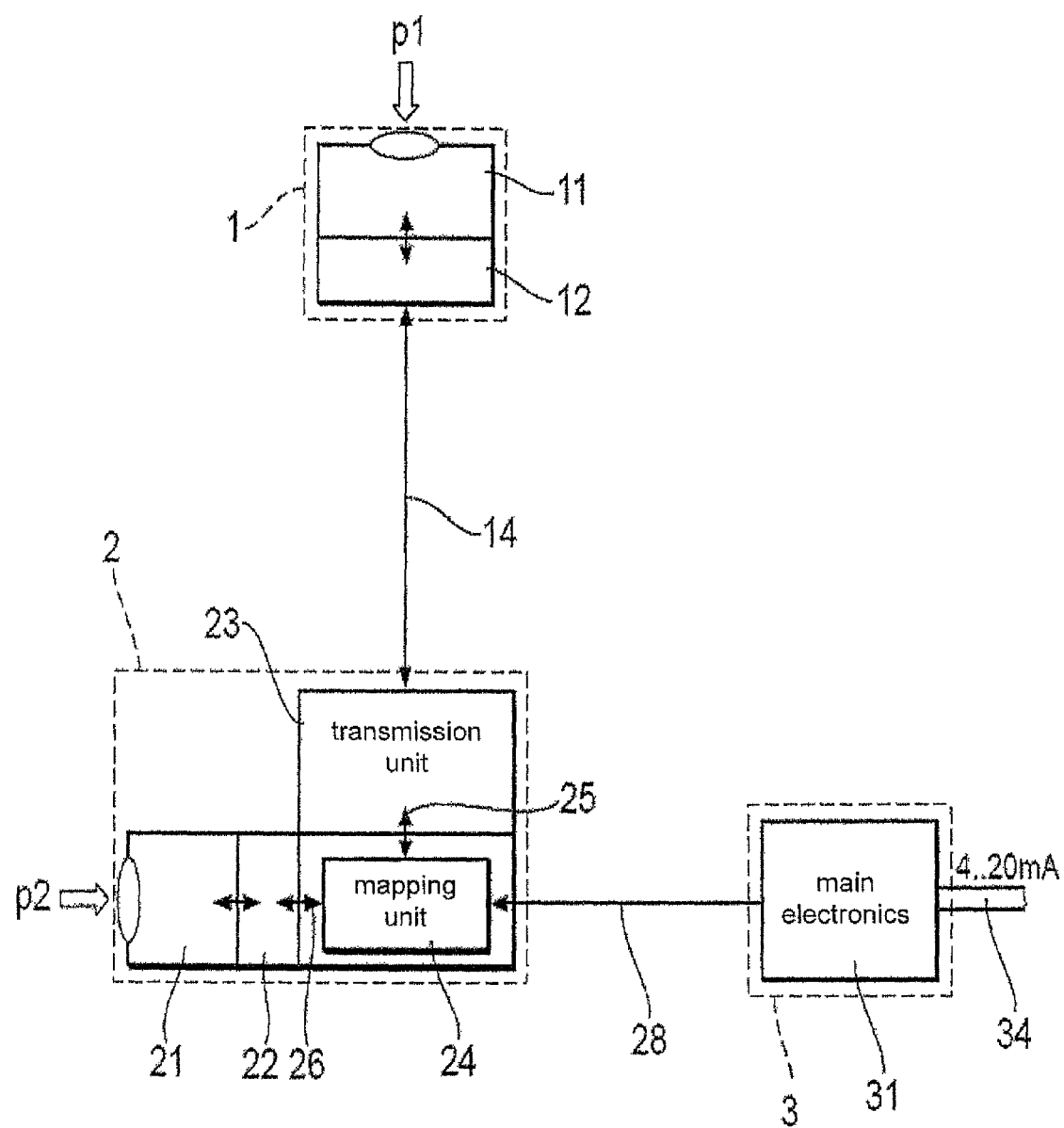
FIG. 1 is a block diagram of a first embodiment of a measuring apparatus of the invention.

The apparatus shown in FIG. 1 includes a first pressure measuring transducer module 1 and a second pressure measuring transducer module 2 as well as an evaluation module 3.

The first pressure measuring transducer module 1 contains a first pressure sensor 11, which is contactable with a first media pressure p1, and which has a transducer for outputting a first primary signal representing the first media pressure, wherein the transducer can be, for example, a capacitive or (piezo-) resistive transducer. Furthermore, the pressure measuring transducer module contains a first temperature sensor, which registers a temperature of the first pressure sensor, and outputs a temperature signal representing temperature. The first pressure measuring transducer module furthermore contains a first signal conditioning circuit 12, which conditions the primary signal of the first pressure sensor and in given cases the temperature signal first in an analog manner, and then digitizes the two signals. The digital signals of the first pressure and the first temperature are transmitted via a first external cable connection 14 to a transmitting unit 23 of the second pressure measuring transducer module 2.

The first external cable connection 14 can have, for example, the following wires:

a direct voltage supply V+ for supplying the first pressure measuring transducer module,
ground,
a clock signal wire, which transmits a clock signal with a clock frequency f1 from the second sensor module to the first sensor module, and
a data wire, which transmits digital signals of the first pressure and the first temperature, for example, with a first transmission rate.

To the extent that such is necessary due to EMC requirements, in addition to the clock signal wire and to the data wire, in each case, a further wire can be provided, which transmits the corresponding signal with the opposite sign.

From the transmitting unit, the digital signals of the first pressure and the first temperature are transmitted via a first internal connection 25 to a mapping unit 24 in the second pressure measuring transducer module 2.

The second pressure measuring transducer module 2 contains, in addition to the already mentioned transmitting unit 23 and the mapping unit 24, a second pressure sensor 21, which is contactable with a second media pressure p2, and which has a transducer 22 for outputting a second primary signal representing the first media pressure, wherein the transducer can be, for example, a capacitive or (piezo-) resistive transducer. Furthermore, the pressure measuring transducer module contains a second temperature sensor, which registers a temperature of the second pressure sensor 21, and outputs a second temperature signal representing the temperature. The second pressure measuring transducer module furthermore contains a second signal conditioning circuit 22, which first conditions the second primary signal of the second pressure sensor and in given cases the second temperature signal in an analog manner, and then digitizes the two signals. From the second signal conditioning circuit, the digital signals of the second pressure and the second temperature are transmitted via a second internal cable connection 26 to the mapping unit 24.

In the case of the first and second internal cable connections 25, 26, due to the short transmission path, the symmetrizing opposite phase lines of the clock signal and the data signal can, in any event, be omitted. Here, besides the energy supply, only a data wire with the first transmission rate and a clocking wire with the clock frequency f1 are provided in each case.

The mapping unit 24 contains a microcontroller (not shown), which, on the one hand, provides the clock signal for the first pressure measuring transducer module 1 and, on the other hand, registers the incoming digital signals of the first pressure and the first temperature as well as the second pressure and the second temperature, and outputs signals, which contain information concerning the first pressure and the second pressure as well as the first and the second temperature, for transmission to the evaluation module 3. Transmission to the evaluation module occurs via a second external cable connection 28, which includes, for example, the following wires:

a direct voltage supply V+ for supplying the second pressure measuring transducer module,
ground,
a clock signal wire, which transmits a clock signal of frequency of f from the evaluation module to the second sensor module, and
a data wire, which transmits the signals from the mapping unit 24 to the evaluation module with the basic first transmission rate or with the halved first transmission rate.

Evaluation module 3 contains the main electronics with a microcontroller for calculating the difference between the first media pressure and the second media pressure, as well as a power supply circuit for connection to a two wire loop, on which the calculated pressure difference is output as a 4 ... 20 mA-electrical current signal.

Furthermore, before calculating the difference, the microcontroller can correct the received pressure measurement values for the first pressure and the second pressure as a function of the associated measured values of temperature using a compensation algorithm.

The power supply circuit provides the supply voltages for the main electronics and for the connected modules. Furthermore, the main electronics contains a HART modem, in order, in given cases, to modulate, onto the electrical current signal, digital signals, which represent one or more of the following measured values: The first pressure, the second pressure, the pressure difference, the first temperature and the second temperature. Furthermore, control commands can be transmitted to the evaluation module via the HART modem.

Figure 2:
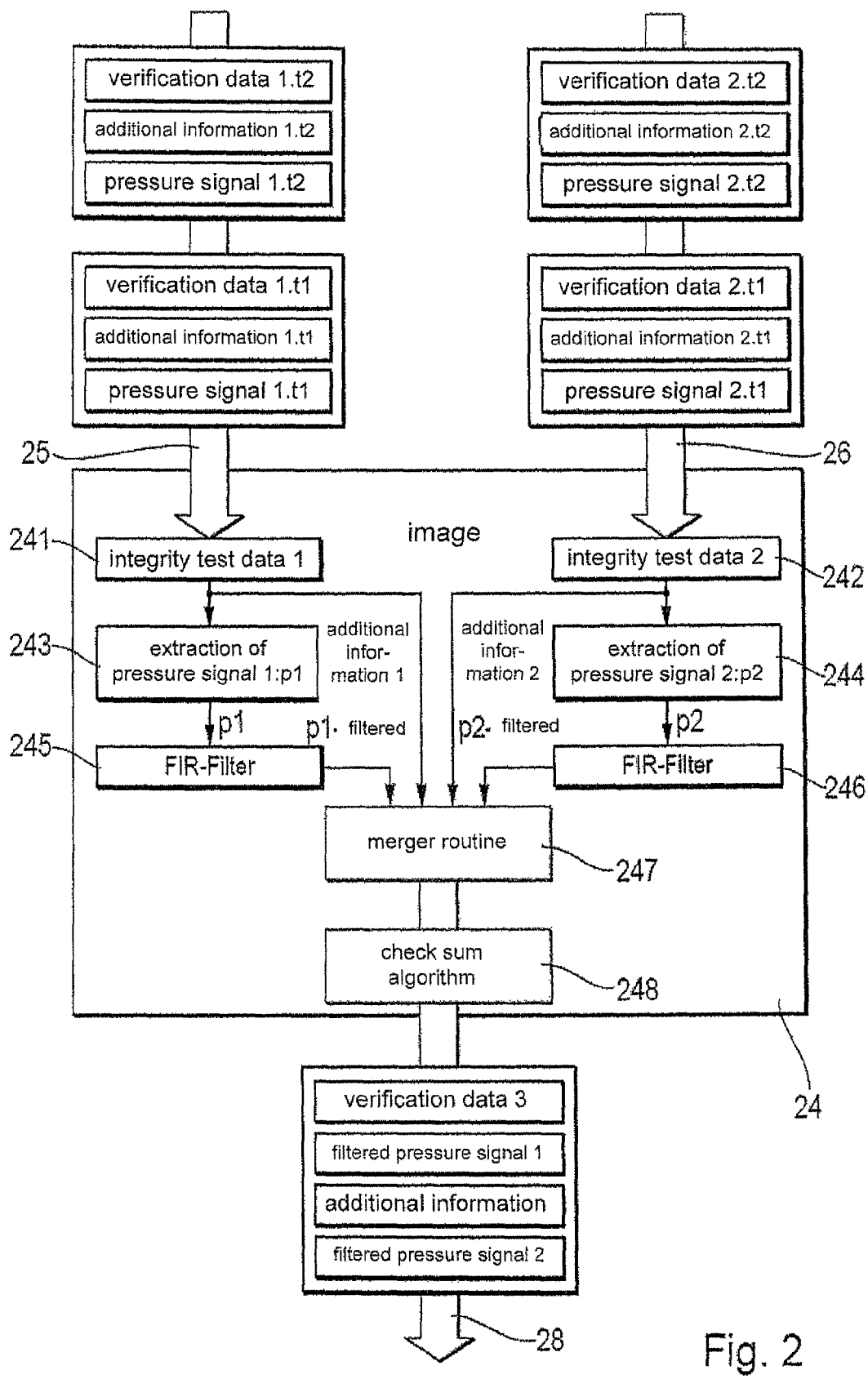
FIG. 2 is a representation of data flow between the modules of the measuring apparatus.

FIG. 2 shows the processing of the incoming signals by the mapping unit 24. The mapping unit 24 receives via the internal combinations 25 and 26 data stream with data sets or frames, which, in each case, contain a pressure signal, a temperature signal—which is designated as "additional information"—and verification data. The data sets are first subjected to integrity tests 241, 242, then the temperature signals and the pressure signals are separated, the pressure signals 243, 244 are, in each case, fed to a FIR filter 245, 246, which, as a result, performs an averaging over two measured values. The average pressure values and the temperature measured values are packaged, by means of a merger routine 247 and a subsequent checksum algorithm, into an output data set, which contains verification data, a filtered first pressure signal, the temperature signals and a filtered second pressure signal. This data set is output to the evaluation module via the second external cable connection 28.

The first pressure measuring transducer module 1 can, in given cases, be galvanically isolated from the evaluation module 2. Additionally, a galvanic isolation can be provided either between the evaluation module and the second pressure measuring transducer module and/or between the second pressure measuring transducer module and the first pressure measuring transducer module.

The invention claimed is:

1. A modular measuring apparatus for outputting a measurement signal representing the difference between a first pressure of a medium at a first location and a second pressure of a medium at a second location, comprising:
   a first pressure measuring transducer module for registering the first pressure and for producing and outputting a sequence of first signals, which, in each case, represent a current value of the first pressure;
   a second pressure measuring transducer module for registering the second pressure and for producing a sequence of second signals which, in each case, represent a current value of the second pressure;
   an evaluation module for ascertaining a sequence of difference values between the first pressure and the second pressure, and for outputting a sequence of fourth signals, which, in each case, represent a difference between the first pressure and the second pressure;
   a first cable connection between said first pressure measuring transducer module and said second pressure measuring transducer module; and
   a second cable connection between said second pressure measuring transducer module and a measurement transmitter, wherein:
   said first pressure measuring transducer module is separated spatially from said second pressure measuring transducer module;
   said evaluation module is separated spatially from both said pressure measuring transducer modules;
   said second pressure measuring transducer module has a mapping unit, which is provided for receiving the sequence of first signals and the sequence of second signals and for producing a sequence of third signals, which, in each case, contain information concerning the first pressure and information concerning the second pressure based on at least one first signal and at least one second signal, and for outputting the sequence of third signals to the evaluation module via said second cable connection.

2. The apparatus as claimed in claim 1, wherein:
the first signal is a digital signal, and/or the second signal is a digital signal.

3. The apparatus as claimed in claim 1, wherein:
said evaluation module is connectable via a third cable connection, especially a two-wire line, to a control system;
the measurement signal is to be output via a third cable connection;
the measuring apparatus is to be supplied with energy via said third cable connection;
said second pressure measuring transducer apparatus is to be supplied with energy via said second cable connection; and
said first pressure measuring transducer module is to be supplied with energy via said first cable connection.

4. The apparatus as claimed in claim 1, which is designed to transmit the first signals with a first transmission rate, the second signals with a second transmission rate and the third signals with a third transmission rate, wherein:
said first and/or said second transmission rate differs from said third transmission rate.

5. The apparatus as claimed in claim 4, wherein:
said first transmission rate is greater than said third transmission rate.

6. The apparatus as claimed in claim 1, wherein:
the third signal contains information concerning the first pressure as an average value of two or more first signals.

7. The apparatus as claimed in claim 1, wherein:
the third signal contains information concerning the second pressure as an average value of two or more second signals.

8. The apparatus as claimed in claim 1, wherein:
said evaluation module and/or said first pressure measuring transducer module and/or said second pressure measuring transducer module have a galvanically isolating interface.

\* \* \* \* \*